US009522433B2

(12) United States Patent
Kato et al.

(10) Patent No.: US 9,522,433 B2
(45) Date of Patent: *Dec. 20, 2016

(54) ROTATION PROCESSING MACHINE

(71) Applicant: AISIN AW CO., LTD., Anjo-shi, Aichi-ken (JP)

(72) Inventors: Susumu Kato, Anjo (JP); Akira Takagai, Anjo (JP); Masahiro Otani, Anjo (JP); Akitomo Kawanishi, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 778 days.

This patent is subject to a terminal disclaimer.

(21) Appl. No.: 13/774,481

(22) Filed: Feb. 22, 2013

(65) Prior Publication Data

US 2013/0223945 A1    Aug. 29, 2013

(30) Foreign Application Priority Data

Feb. 24, 2012 (JP) .................................. 2012-038720
Mar. 30, 2012 (JP) .................................. 2012-078817
Jul. 20, 2012 (JP) .................................. 2012-161618

(51) Int. Cl.
*B23Q 3/157* (2006.01)
*B23F 23/04* (2006.01)
*B23F 23/06* (2006.01)
*B23F 5/20* (2006.01)
*B23Q 7/04* (2006.01)
*B23F 19/10* (2006.01)

(52) U.S. Cl.
CPC ............. *B23F 23/04* (2013.01); *B23Q 3/157* (2013.01); *B23Q 7/046* (2013.01); *B23F 5/20* (2013.01);

(Continued)

(58) Field of Classification Search
CPC ............ Y10T 409/100795; Y10T 409/100954; Y10T 483/16; B23Q 7/046; B23Q 7/10; B23F 23/04; B23F 23/02

(Continued)

(56) References Cited

U.S. PATENT DOCUMENTS 4,457,659 A * 7/1984 Watanabe ............... B23F 23/04
                                                    414/223.01
5,213,559 A    5/1993 Lunazzi
(Continued)

FOREIGN PATENT DOCUMENTS

GB        889132 A  *  2/1962
JP        37-5992 Y1    4/1962
(Continued)

OTHER PUBLICATIONS

Machine Translation of JP 2005-262354-A, which JP '354 was published Sep. 2005.*

(Continued)

*Primary Examiner* — Erica E Cadugan
(74) *Attorney, Agent, or Firm* — Sughrue Mion, PLLC

(57) ABSTRACT

A rotation processing machine includes a rotating device supporting a cylindrical workpiece via a rotation support jig; a processing device on which a cutting tool is mounted; and a turning loader that has grippers arranged about a turning central axis and that turns so that the grippers sequentially face the rotating device. The grippers are configured to individually move up and down, and a height position of each gripper is settable to a first height position where the gripper delivers and receives the cylindrical workpiece to and from the rotating device, and a second height position where the gripper delivers and receives the rotation support jig to and from the rotating device. The turning loader turns each of the grippers between an external delivery/reception (Continued)

position where the gripper faces an external transfer stand and an internal delivery/reception position where the gripper faces the rotating device, and is configured to set the gripper to the first or second height position at one of the external delivery/reception position and the internal delivery/reception position, and to turn the gripper to the other delivery/reception position while holding the gripper at the set height position.

9 Claims, 7 Drawing Sheets

(52) U.S. Cl.
CPC ................ *B23F 19/10* (2013.01); *B23F 23/06* (2013.01); *Y10T 409/100795* (2015.01); *Y10T 409/100954* (2015.01); *Y10T 409/101113* (2015.01); *Y10T 409/103657* (2015.01); *Y10T 409/109699* (2015.01); *Y10T 483/16* (2015.01); *Y10T 483/1702* (2015.01); *Y10T 483/1736* (2015.01)

(58) Field of Classification Search
USPC ............................................ 409/6–7; 483/14
See application file for complete search history.

(56) References Cited

U.S. PATENT DOCUMENTS

| | | | |
|---|---|---|---|
| 5,228,814 A * | 7/1993 | Suwijn | B23F 5/04 409/12 |
| 5,904,457 A | 5/1999 | Suwijn et al. | |
| 7,108,647 B2 * | 9/2006 | Nakazawa | B23Q 1/66 29/33 P |
| 8,506,358 B2 | 8/2013 | Amarell et al. | |
| 2013/0225379 A1 * | 8/2013 | Kato | B23Q 3/157 483/1 |

FOREIGN PATENT DOCUMENTS

| | | | |
|---|---|---|---|
| JP | 57-201124 A | * | 12/1982 |
| JP | 62-255012 A | | 11/1987 |
| JP | 63-102857 A | | 5/1988 |
| JP | 187828 U | | 6/1989 |
| JP | 06-022782 B2 | | 3/1994 |
| JP | 11-291125 A | | 10/1999 |
| JP | 2002-066861 A | | 3/2002 |
| JP | 2002-233922 A | | 8/2002 |
| JP | 2005-238358 A | * | 9/2005 |
| JP | 2005262354 A | | 9/2005 |
| JP | 201179127 A | | 4/2011 |
| JP | 2013-226636 A | | 11/2013 |
| JP | 2013226637 A | | 11/2013 |
| JP | 2013226638 A | | 11/2013 |
| JP | 201461591 A | | 4/2014 |

OTHER PUBLICATIONS

International Search Report of PCT/JP2013/054084 dated Mar. 19, 2013.
International Search Report of PCT/JP2013/054085 dated Mar. 19, 2013.
Communication from United States Patent and Trademark Office issued Sep. 11, 2015 in U.S. Appl. No. 13/772,912.

* cited by examiner

F I G . 5
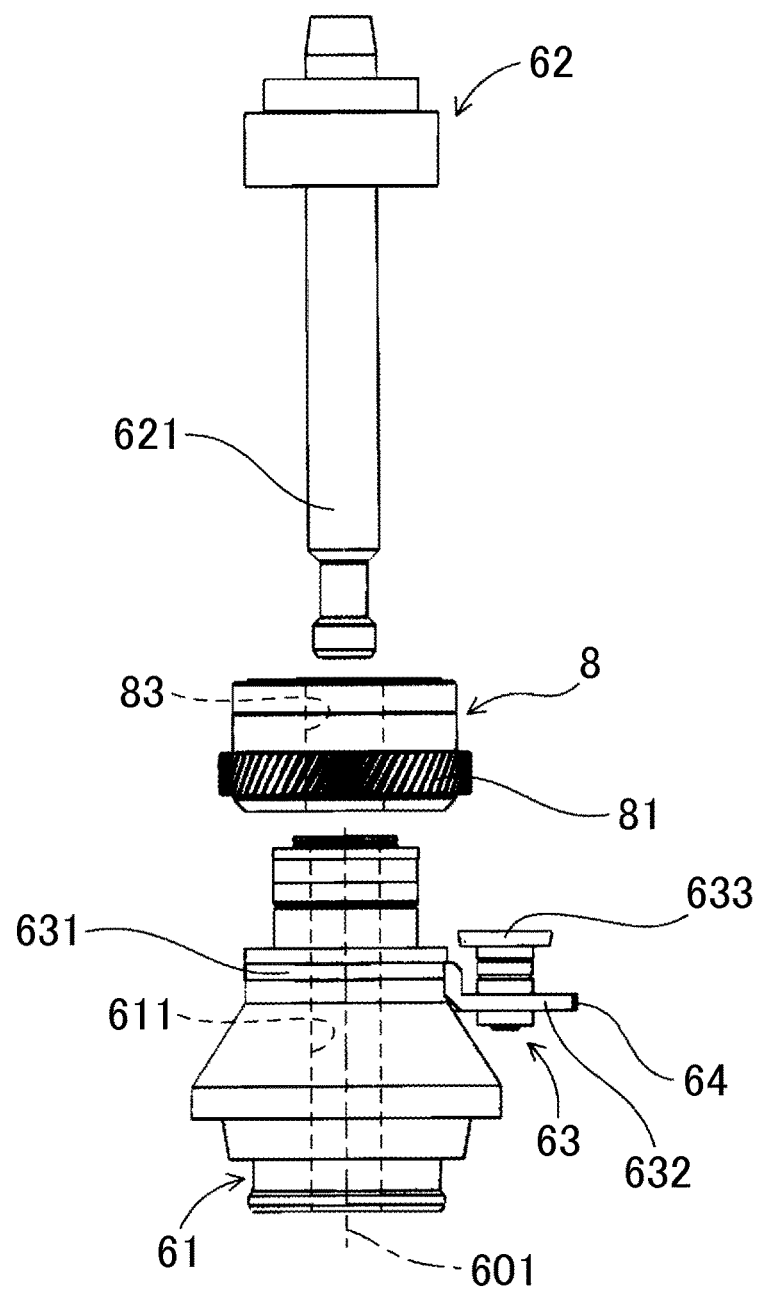

F I G . 7
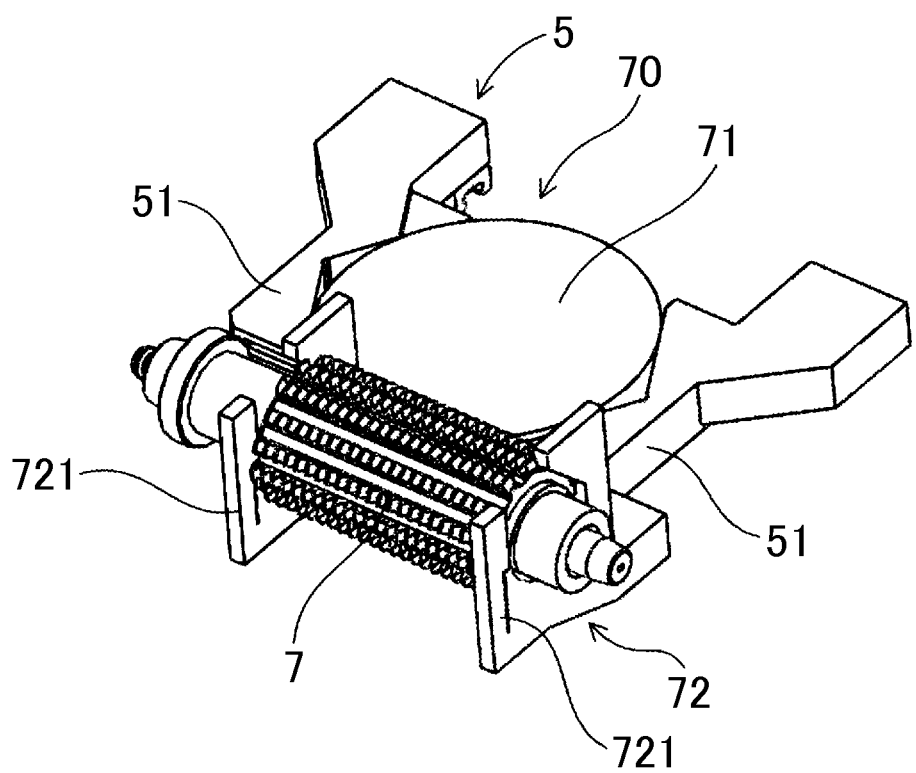

ROTATION PROCESSING MACHINE

INCORPORATION BY REFERENCE

The disclosures of Japanese Patent Application Nos. 2012-078817, 2012-038720, and 2012-161618 filed on Mar. 30, 2012, Feb. 24, 2012, and Jul. 20, 2012, respectively, including the specifications, drawings and abstracts are incorporated herein by reference in its entirety.

BACKGROUND OF THE INVENTION

The present invention relates to rotation processing machines that process a cylindrical workpiece rotated by a rotating device, by using a cutting tool mounted on a processing device.

DESCRIPTION OF THE RELATED ART

In a hobbing machine serving as a rotation processing machine that cuts tooth surfaces on the outer periphery of a cylindrical workpiece, the cylindrical workpiece is supported by a rotating device, a hob cutting tool is supported by a processing device, and the outer periphery of the cylindrical workpiece rotated by the rotating device is cut with the hob cutting tool rotated by the processing device, thereby forming the tooth surfaces. In the rotating device, a rotation support jig formed by a pair of jig portions is used in order to support both ends of the cylindrical workpiece.

Changeover of the hob cutting tool and the rotation support jig is performed by using a robot or a dedicated changeover device according to the shape of the cylindrical workpiece to be processed.

For example, the workpiece setup method of Japanese Patent Application Publication No. 2002-233922 (JP 2002-233922 A) uses a machine tool including processing tool stands each having cutting means and capable of reciprocating, and a table provided thereon with workpiece stands on which a workpiece is placed. The workpiece stands are moved by relatively moving the processing tool stands and the table.

For example, the processing cell system of Japanese Examined Patent Application Publication No. H06-22782 (JP H06-22782 B) has an automatic processing machine that processes a workpiece, and a setup station that sets up a jig or tool required to process the workpiece. The workpiece for processing and the jig or tool for processing setup are supplied to the automatic processing machine by a robot. The jig or tool, the workpiece, and a storage medium storing information such as setup information can be transferred and moved in a set in any process between the automatic processing machine and the setup station by transfer means.

For example, in Japanese Patent Application Publication No. H11-291125 (JP H11-291125 A) regarding a hobbing machine discloses that unprocessed and processed workpieces are repeatedly carried in and out by a turning loader to and from a table that rotates the workpiece.

SUMMARY OF THE INVENTION

However, changeover of the hob cutting tool and the rotation support jig is performed by using the robot or the dedicated changeover device. This increases overall initial investment in the processing device for performing changeover. Moreover, there are many interfering members during changeover of the hob cutting tool and the rotation support jig, which increases the time required for changeover.

The present invention was developed in view of the above conventional problems, and it is an object of the present invention to provide a rotation processing machine in which a cylindrical workpiece, a rotation support jig, and a cutting tool can be delivered and received by using the same turning loader, and which can reduce the time required for changeover of the rotation support jig and the cutting tool.

According to one aspect of the present invention, a rotation processing machine includes: a rotating device that supports a cylindrical workpiece via a rotation support jig and rotates; a processing device on which a cutting tool is mounted to process the cylindrical workpiece; and a turning loader that has a plurality of grippers arranged about a turning central axis and that turns so that the plurality of grippers sequentially face the rotating device. In the rotation processing machine, the plurality of grippers are configured to individually move up and down, and a height position of each of the plurality of grippers is settable to a first height position where the gripper delivers and receives the cylindrical workpiece to and from the rotating device, and a second height position where the gripper delivers and receives the rotation support jig to and from the rotating device, and the turning loader is configured to turn each of the grippers between an external delivery/reception position where the gripper faces an external transfer stand and an internal delivery/reception position where the gripper faces the rotating device, and is configured to set the height position of the gripper to the first height position or the second height position at one of the external delivery/reception position and the internal delivery/reception position, and to turn the gripper to the other delivery/reception position while holding the gripper at the set height position.

In the above rotation processing machine, the height position of each gripper of the turning loader is set in two stages, and each gripper is turned between the external delivery/reception position where the gripper faces the external transfer stand and the internal delivery/reception position where the gripper faces the rotating device, while being held at the set height position.

When processing the workpiece, the rotation support jig corresponding to the kind of workpiece is held by the gripper at the external delivery/reception position, and the height position of this gripper is set to the second height position where the gripper delivers and receives the rotation support jig. The second height position is set to such a height that the gripper and the rotation support jig do not interfere with the rotating device when the turning loader is turned. With the gripper being held at the second height position, the turning loader is turned to move the rotation support jig held by the gripper from the external delivery/reception position to the internal delivery/reception position so that the rotation support jig faces the rotating device. The gripper is moved downward to mount the rotation support jig held by the gripper onto the rotating device.

A workpiece before processing is held by the gripper at the external delivery/reception position, and the height position of this gripper is set to the first height position where the gripper delivers and receives the workpiece. The first height position is set to such a height that the gripper and the workpiece do not interfere with the rotating device when the turning loader is turned. With the gripper being held at the first height position, the turning loader is turned to move the workpiece held by the gripper from the external delivery/reception position to the internal delivery/reception position so that the workpiece faces the rotating device. The gripper is moved downward to mount the workpiece onto the rotation support jig mounted on the rotating device. The workpiece is thus carried in.

Then, the workpiece rotated by the rotating device is processed by the cutting tool on the processing device. Thereafter, the processed workpiece in the rotating device is held by the gripper located at the internal delivery/reception position, and the turning loader is turned to move this gripper to the external delivery/reception position, thereby carrying the workpiece out. Subsequently, the operation of carrying the workpiece in, processing the workpiece, and carrying the workpiece out is repeated according to the number of workpieces to be processed.

If changeover of the rotation support jig is needed according to the kind of workpiece to be processed, the turning loader is turned so that the gripper holding the rotation support jig moves between the internal delivery/reception position and the external delivery/reception position while being held at the set height position in a manner similar to that described above.

The first height position and the second height position can be set to different height positions from each other. That is, in the rotation processing machine, the height position of the gripper of the turning loader can be switched between the two height positions, namely the position where the gripper delivers and receives the workpiece and the position where the gripper delivers and receives the rotation support jig. This can reduce the time required to move the gripper of the turning loader up and down when delivering and receiving the workpiece and the rotation support jig, and thus can reduce the time required for transfer of the workpiece and for changeover of the rotation support jig.

In the rotation processing machine, the workpiece and the rotation support jig can be delivered and received by using the same turning loader. This can also reduce the time required for changeover of the rotation support jig.

BRIEF DESCRIPTION OF THE DRAWINGS

FIG. 5 is a front view showing the rotation support jig formed by one jig portion and the other jig portion according to the embodiment;

FIG. 7 is a perspective view showing the state where the pallet holding the cutting tool is held by the gripper.

DETAILED DESCRIPTION OF THE EMBODIMENTS

Figure 1:
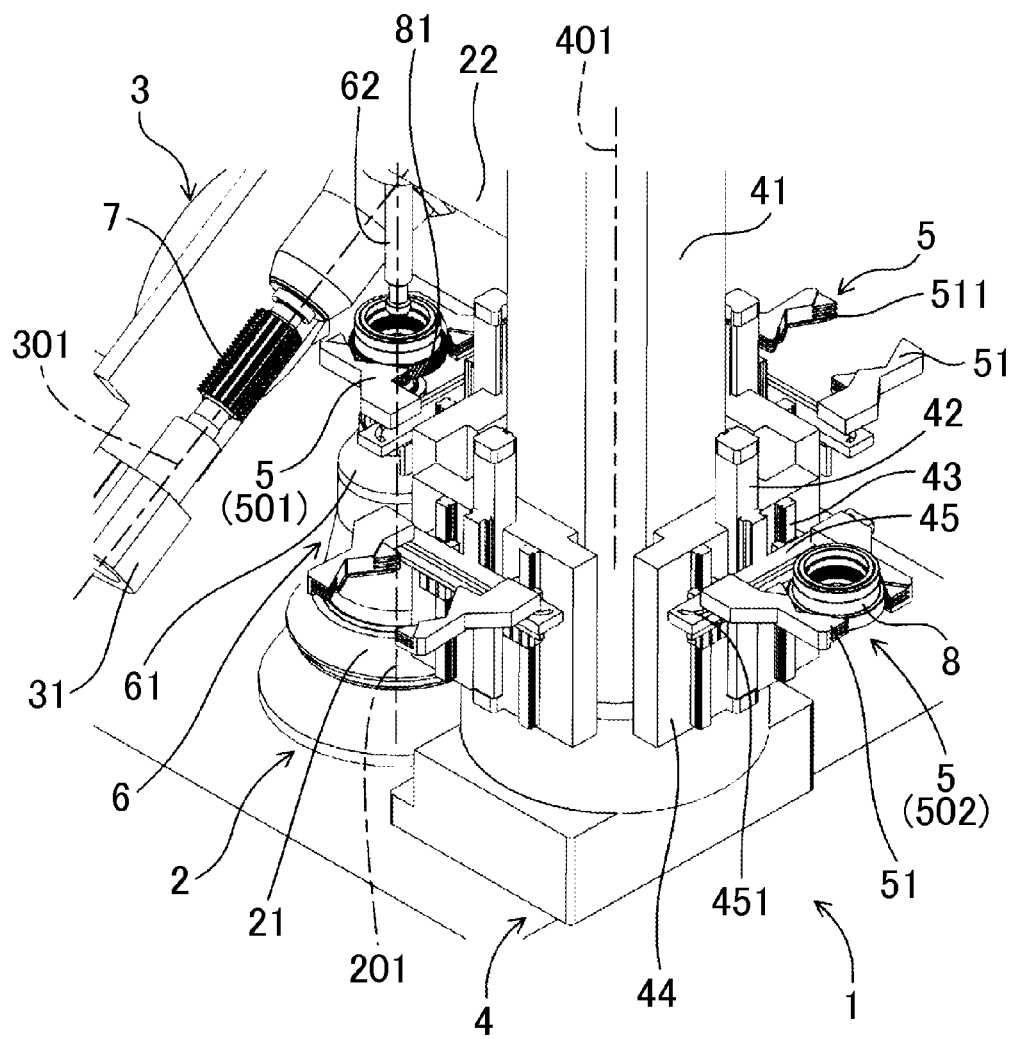
FIG. 1 is a perspective view showing a rotation processing machine according to an embodiment.

Preferred embodiments of the above rotation processing machine will be described.

In the above rotation processing machine, the rotation support jig may be formed by one jig portion that is mounted on one rotating spindle of the rotating device, and the other jig portion that is mounted on the other rotating spindle placed coaxially with the one rotating spindle in the rotating device, and the turning loader may be configured to allow the gripper to hold the rotation support jig having the one jig portion combined with the other jig portion.

In this case, the rotating device rotates the workpiece held between the one jig portion on the one rotating spindle and the other jig portion on the other rotating spindle, and the processing device can stably process the workpiece.

The turning loader allows the gripper to hold the rotation support jig formed by the one jig portion and the other jig portion, and can move this rotation support jig between the external delivery/reception position and the internal delivery/reception position.

A height position of each of the plurality of grippers may be able to be set to a third height position where the gripper delivers and receives the cutting tool to and from the processing device, and the turning loader may be configured to set the height position of the gripper to the third height position at one of the external delivery/reception position and the internal delivery/reception position, and to turn the gripper to the other delivery/reception position while holding the gripper at the set height position.

In this case, when processing the workpiece, the cutting tool corresponding to the kind of workpiece is directly or indirectly held by the gripper at the external delivery/reception position, and the height position of this gripper is set to the third height position where the gripper delivers and receives the cutting tool. The third height position is set to such a height that the gripper and the cutting tool do not interfere with the rotating device when the turning loader is turned. With the gripper being held at the third height position, the turning loader is turned to move the cutting tool held by the gripper from the external delivery/reception position to the internal delivery/reception position so that the cutting tool faces the rotating device. A cutting-tool mounting portion of the processing device is moved to mount the cutting tool held by the gripper onto the cutting-tool mounting portion.

The gripper may directly hold the cutting tool or may indirectly hold the cutting tool via a pallet etc.

The cutting tool may be configured to be held by a pallet, the pallet may have a base portion that is held by the gripper, and a cutting-tool holding portion that is formed at a position offset from a center of the base portion and that holds the cutting tool, and with the pallet being held by the gripper, the cutting-tool holding portion may be located outward of a turning radius of the gripper, and the processing device may be configured so that the cutting-tool mounting portion of the processing device is advanced, and so that the cutting tool held on the cutting-tool holding portion of the pallet held by the gripper is mounted on the cutting-tool mounting portion that has been advanced.

In this case, using the pallet allows delivery and reception of the cutting tool between each gripper and the processing device to be easily performed in a short time.

The processing device may be configured so that the cutting-tool mounting portion is moved up and down, and may be configured so that, with the gripper being held at the third height position, the cutting tool on the cutting-tool holding portion of the pallet held by the gripper is received by the cutting-tool mounting portion.

In general, the cutting-tool mounting portion can be moved with high accuracy in order to ensure processing accuracy of the workpiece. The cutting-tool mounting portion of the processing device is moved up and down to receive the cutting tool from the pallet. This can simplify the operation of the turning loader and the plurality of grippers.

[Embodiment]

An embodiment of the rotation processing machine will be described below with reference to the accompanying drawings.

Figure 2:
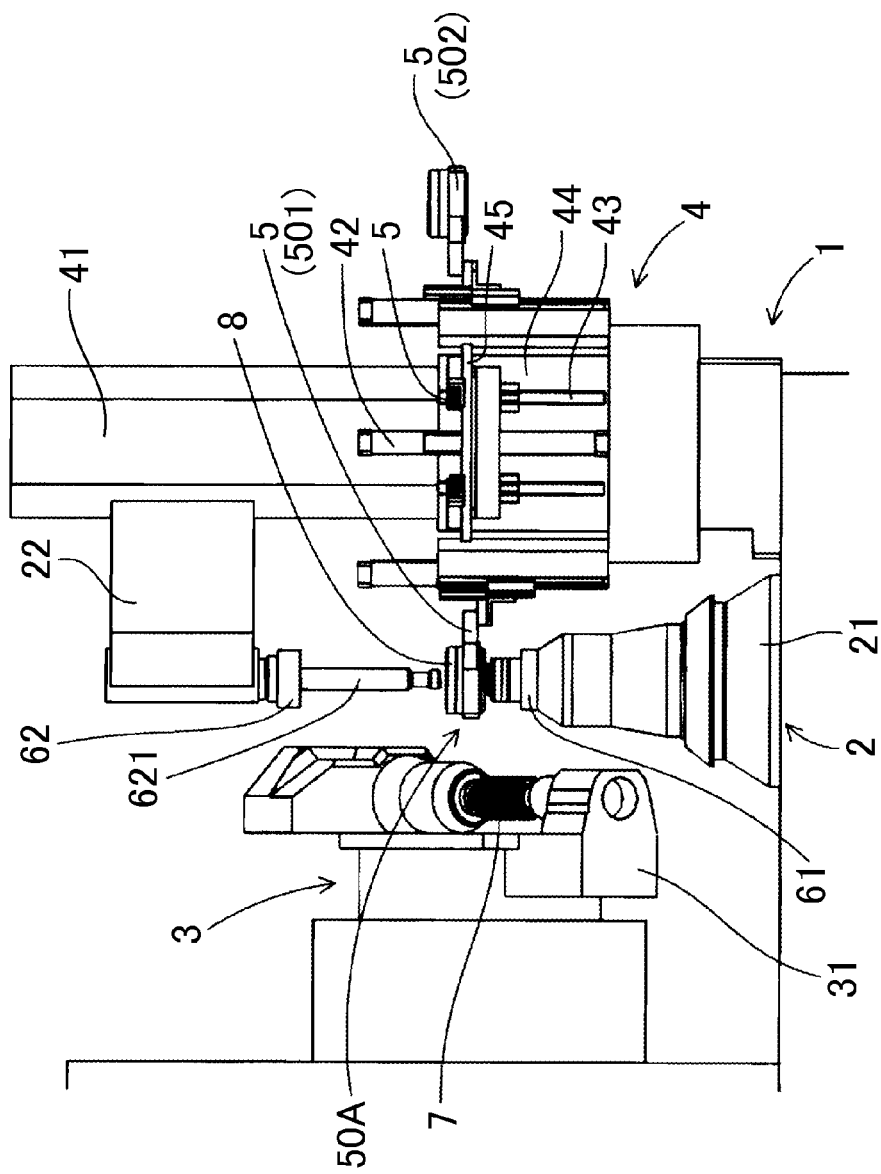
FIG. 2 is a front view showing the rotation processing machine in which a gripper holding a cylindrical workpiece has been set at a first height position and turned from an external delivery/reception position to an internal delivery/reception position according to the embodiment.
Figure 3:
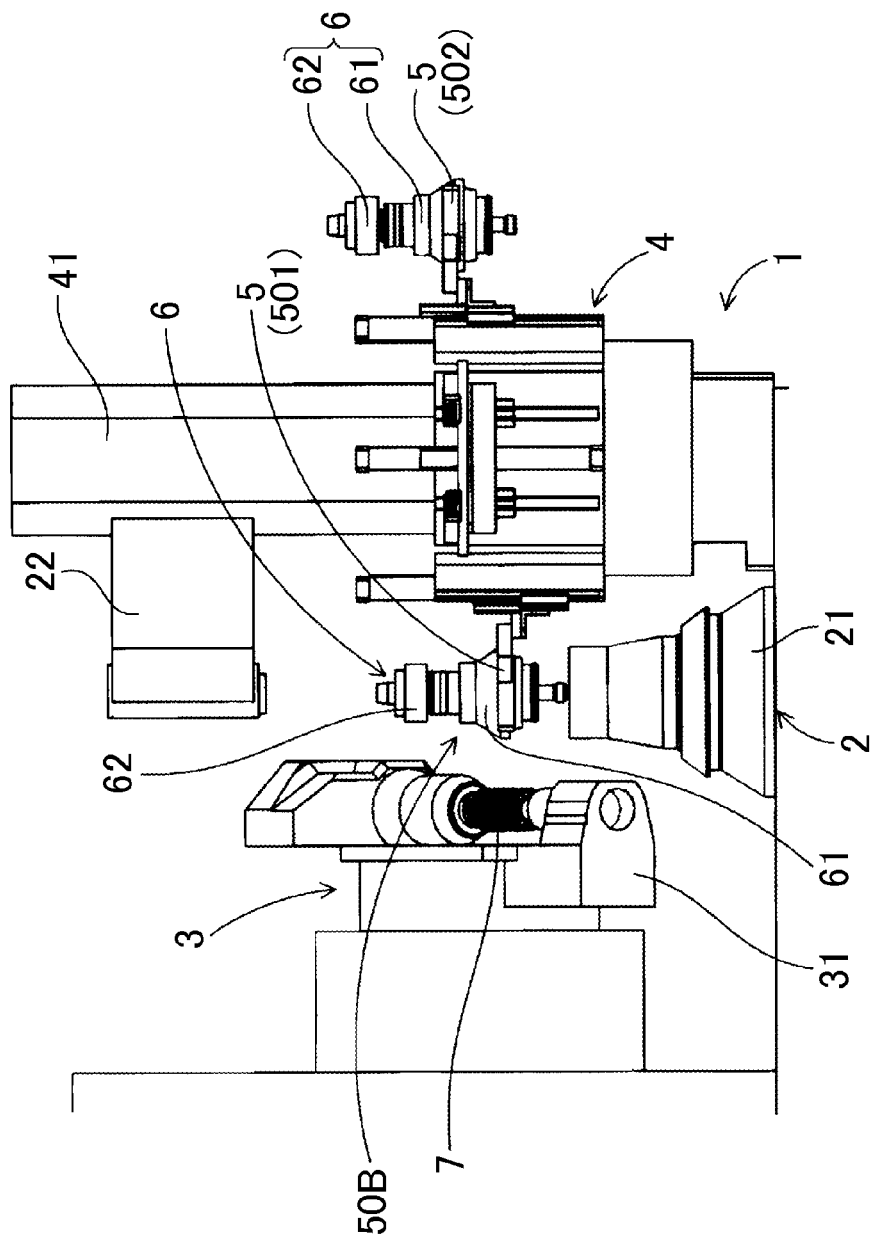
FIG. 3 is a front view showing the rotation processing machine in which the gripper holding a rotation support jig has been set at a second height position and turned from the external delivery/reception position to the internal delivery/reception position according to the embodiment.
Figure 4:
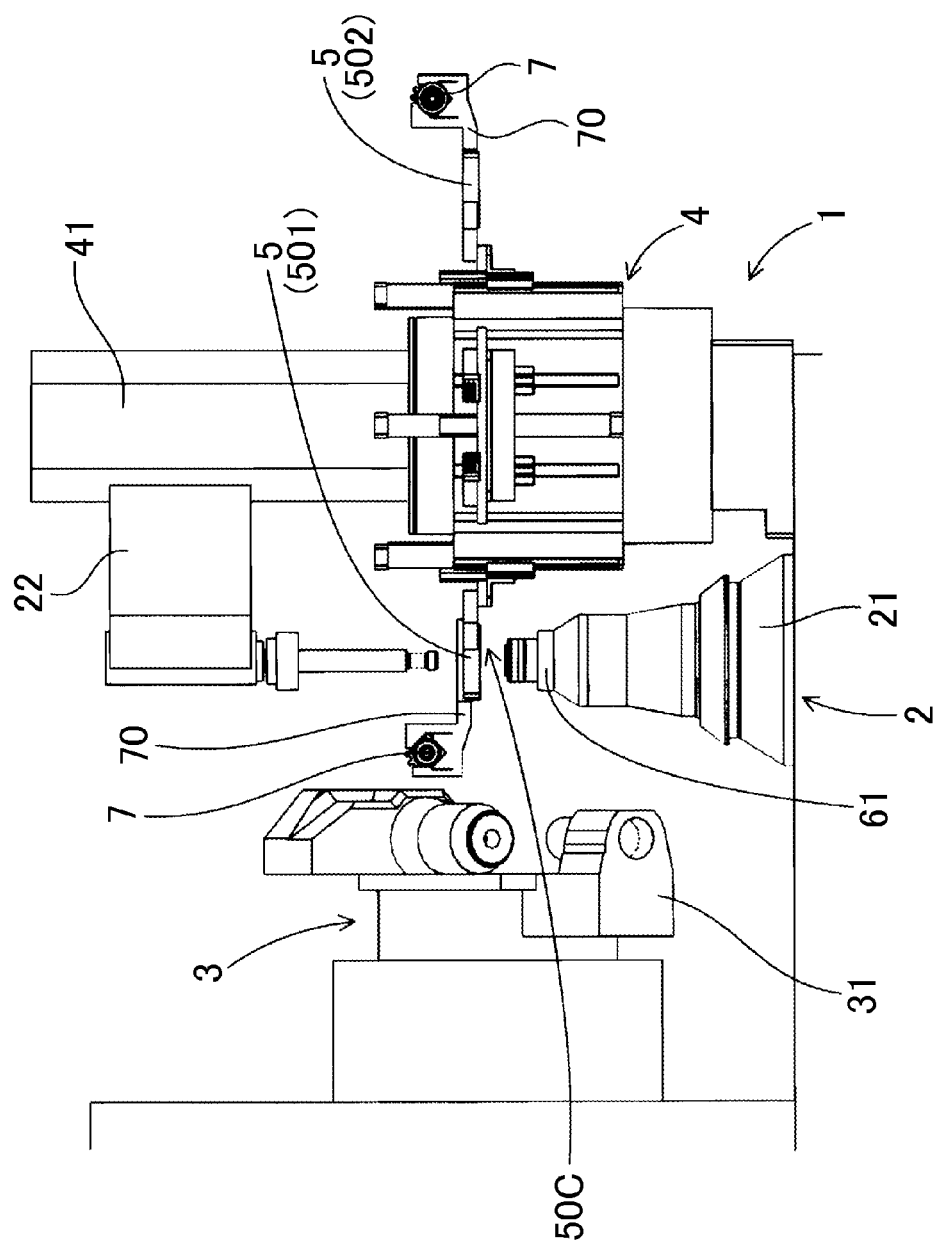
FIG. 4 is a front view showing the rotation processing machine in which the gripper holding a pallet with a cutting tool held thereon has been set at a third height position and turned from the external delivery/reception position to the internal delivery/reception position according to the embodiment.

As shown in FIG. 1, a rotation processing machine 1 of the present embodiment includes a rotating device 2 that supports a cylindrical workpiece 8 via a rotation support jig 6 and rotates, a processing device 3 on which a cutting tool 7 is mounted to process the cylindrical workpiece 8, and a turning loader 4 that has a plurality of grippers 5 arranged about a turning central axis 401 and that turns so that the plurality of grippers 5 sequentially face the rotating device 2. The plurality of grippers 5 are configured to move up and down independently, and a height position of each of the plurality of grippers 5 can be set to a first height position 50A where the gripper 5 delivers and receives the cylindrical workpiece 8 to and from the rotating device 2 as shown in FIG. 2, a second height position 50B where the gripper 5 delivers and receives the rotation support jig 6 to and from the rotating device 2 as shown in FIG. 3, and a third height position 50C where the gripper 5 delivers and receives the cutting tool 7 to and from the processing device 3 as shown in FIG. 4.

The turning loader 4 is configured to turn each gripper 5 between an external delivery/reception position 502 where the gripper 5 faces an external transfer stand (not shown) and an internal delivery/reception position 501 where the gripper 5 faces the rotating device 2. The turning loader 4 is configured to set the height position of the gripper 5 to one of the first to third height positions 50A, 50B, 50C at one of the external delivery/reception position 502 and the internal delivery/reception position 501, and to turn the gripper 5 to the other delivery/reception position 501, 502 while holding the gripper 5 at the set height position 50A, 50B, 50C.

The rotation processing machine 1 of the present embodiment will be described in detail below with reference to FIGS. 1 to 7.

As shown in FIG. 1, the processing device 3 and the rotating device 2 of the rotation processing machine 1 according to the present embodiment form a hobbing machine that form tooth surfaces 81 on the outer periphery of the cylindrical workpiece 8 with a hob serving as the cutting tool 7. The rotation processing machine 1 of the present embodiment allows transfer of the cylindrical workpiece 8 to the hobbing machine and changeover (replacement) of the rotation support jig 6 and the cutting tool 7 on the hobbing machine to be performed by the turning loader 4. The processing device 3 and the rotating device 2 of the present embodiment cut teeth into the cylindrical workpiece 8 with a circular cross section to produce a helical gear as a product.

The cylindrical workpiece 8 of the present embodiment has a disc shape for gears, and the gripper 5 is configured to hold the outer periphery of the cylindrical workpiece 8 having a disc shape. The gripper 5 is capable of holding a plurality of kinds of cylindrical workpieces 8 with different outer diameters by varying the interval between a pair of gripping portions 51.

Engaging portions 511 that overlap one another in the vertical direction to engage with each other when holding the cylindrical workpiece 8 with a small outer diameter are formed in the pair of gripping portions 51 of the gripper 5. The gripper 5 of the present embodiment is configured to move toward and away from each other the pair of gripping portions 51 that hold the cylindrical workpiece 8, the rotation support jig 6, or a pallet 70 therebetween from both sides in the horizontal direction.

As shown in FIG. 1, the processing device 3 is configured such that a rotation central axis 301 of a cutting-tool mounting portion (hob spindle) 31 on which the cutting tool 7 is mounted is tilted with respect to the horizontal direction. The rotating device 2 is configured to rotate about a rotation central axis 201 extending in the vertical direction. The processing device 3 forms the tooth surfaces 81 in a helical pattern by cutting with the rotating cutting tool 7 the outer periphery of the cylindrical workpiece 8 rotated by the rotating device 2.

The processing device 3 is capable of rotating the cutting-tool mounting portion 31, and is configured to move the cutting-tool mounting portion 31 forward and backward and up and down. The processing device 3 is placed on the extension of a line connecting the rotating device 2 and the turning loader 4 such that the rotating device 2 is interposed between the processing device 3 and the turning loader 4.

As shown in FIG. 2, the rotating device 2 is configured to rotate one rotating spindle 21 provided on a rotating table by using a rotation drive source, and the other rotating spindle 22 rotates in response to rotation of the one rotating spindle 21. The rotating device 2 of the present embodiment is placed such that its rotation central axis 201 extends in the vertical direction, with the one rotating spindle 21 being on the lower side in the vertical direction and the other rotating spindle 22 being on the upper side in the vertical direction. The other rotating spindle 22 is attached to a turning central support column 41 of the turning loader 4.

The rotating device 2 is placed at a position interposed between the processing device 3 and the turning loader 4, and is configured to support the workpiece 8 from both sides and to rotate about the rotation central axis 201 parallel to the turning central axis 401 of the turning loader 4.

The rotation support jig 6 is formed by one jig portion 61 that is mounted on the one rotating spindle 21 of the rotating device 2, and the other jig portion 62 that is mounted on the other rotating spindle 22 placed coaxially with the one rotating spindle 21 in the rotating device 2. The other jig portion 62 can be carried in combination with the one jig portion 61.

A cylindrical workpiece 8 before processing is carried in by the turning loader 4 to a position between the one jig portion 61 mounted on the one rotating spindle 21 and the other jig portion 62 mounted on the other rotating spindle 22. A processed cylindrical workpiece 8 is carried out by the turning loader 4 from the position between the one jig portion 61 mounted on the one rotating spindle 21 and the other jig portion 62 mounted on the other rotating spindle 22.

As shown in FIG. 1, the turning loader 4 of the present embodiment is formed by turnably arranging the plurality of grippers 5 around the turning central support column 41. The turning central axis 401 of the turning central support column 41 extends in the vertical direction, and each gripper 5 is configured to turn about the turning central support column 41 in the horizontal direction.

The plurality of grippers 5 are configured to hold the workpiece 8, the cutting tool 7, and the rotation support jig 6 from a direction perpendicular to the turning central axis 401 of the turning loader 4 and the rotation central axis 201 of the rotating device 2, and to pass between the one rotating spindle 21 and the other rotating spindle 22 of the rotating device 2.

The gripper 5 of the present embodiment is provided at four positions shifted by 90° from each other around the turning central support column 41. Each gripper 5 can be individually moved up and down with respect to the turning central support column 41. The gripper 5 may be provided at regular intervals at two or three positions or five or more positions around the turning central support column 41.

As shown in FIGS. 2 to 4, the turning loader 4 of the present embodiment is configured to carry any of the cylindrical workpiece 8, the rotation support jig 6, and the pallet 70 holding the cutting tool 7 in and out. Each gripper 5 is configured to sequentially turn to the internal delivery/reception position 501 to face the rotating device 2, and to the external delivery/reception position 502 located on the opposite side of the turning central support column 41 from the rotating device 2.

Each gripper 5 of the present embodiment is configured to supply a cylindrical workpiece 8 before processing to the rotating device 2 and take out a processed cylindrical workpiece 8 from the rotating device 2, to supply and take out the rotation support jig 6 to and from the rotating device 2, and to supply and take out the cutting tool 7 to and from the processing device 3.

Although not shown in the figures, a transfer device capable of transferring any of the cylindrical workpiece 8, the rotation support jig 6, and the pallet 70 is placed on the opposite side of the turning loader 4 from the rotating device 2.

As shown in FIG. 1, the turning loader 4 is configured to turn the plurality of grippers 5 by a drive source such as a motor so that each gripper 5 is moved by a predetermined circumferential angle at a time at which the grippers 5 are arranged. Each gripper 5 can individually slide up and down by an electric actuator 42 provided over the turning central support column 41. Linear guides 43 are placed on both sides of the electric actuator 42 over the turning central support column 41. Each gripper 5 can slide up and down along the linear guides 43 in response to the driving force of the electric actuator 42.

The electric actuator 42 and the pair of linear guides 43 are placed on a base plate 44 provided on the turning central support column 41. A cam guide 45 is attached to the electric actuator 42 and the pair of linear guides 43. The cam guide 45 has a guide portion 451 that is used when the pair of gripping portions 51 of the gripper 5 open and close. The guide portion 451 has a linear shape in its central portion where the pair of gripping portions 51 are closed, so that the pair of gripping portions 51 extend parallel to each other. The guide portion 451 is curved toward the turning central support column 41 in its outer portions where the pair of gripping portions 51 are opened.

As shown in FIG. 5, with the other jig portion 62 being placed on and combined with the one jig portion 61, the rotation support jig 6 is transferred (carried) to the rotating device 2 by the turning loader 4. Each of the rotation support jig 6, the cylindrical workpiece 8, and the cutting tool 7 placed on the external transfer stand or a robot is held by the gripper 5 located at the external delivery/reception position 502, and the turning loader 4 is turned to move this gripper 5 to the internal delivery/reception position 501. Thus, each of the rotation support jig 6, the cylindrical workpiece 8, and the cutting tool 7 is transferred to the position facing the rotating device 2.

The rotation support jig 6 is configured so that the one jig portion 61 and the other jig portion 62 are combined together with their respective centers being aligned with each other by inserting a central shaft 621 protruding downward at a center position of the other jig portion 62, into a central hole 611 formed in a center position of the one jig portion 61. A central hole 83 is formed in the center of the cylindrical workpiece 8. When holding the cylindrical workpiece 8 between the one jig portion 61 and the other jig portion 62, the central shaft 621 inserted through the central hole 83 of the cylindrical workpiece 8 is inserted into the central hole 611. The one jig portion 61 and the other jig portion 61 are combined together with the respective centers of the central shaft 621 and the central hole 611 being aligned with each other, regardless of whether the one jig portion 61 and the other jig portion 62 hold the cylindrical workpiece 8 therebetween or not.

The rotation support jig 6 is mounted onto the rotating device 2 as follows.

As shown in FIGS. 3 and 5, the gripper 5 located at the external delivery/reception position 502 first holds the rotation support jig 6 having the other jig portion 62 being placed on the one jig portion 61, from the external transfer stand or the robot. Next, the turning loader 4 is turned to move the gripper 5 located at the external delivery/reception position 502 to the internal delivery/reception position 501. Then, the gripper 5 moved to the internal delivery/reception position 501 is moved downward to mount the one jig portion 61 onto the one rotating spindle 21. Thereafter, the other rotating spindle 22 provided on the turning central support column 41 of the turning loader 4 is moved downward to mount the other jig portion 62 onto the other rotating spindle 22. Subsequently, the other rotating spindle 22 is moved upward so that the cylindrical workpiece 8 can be received between the one jig portion 61 and the other jig portion 62.

Figure 6:
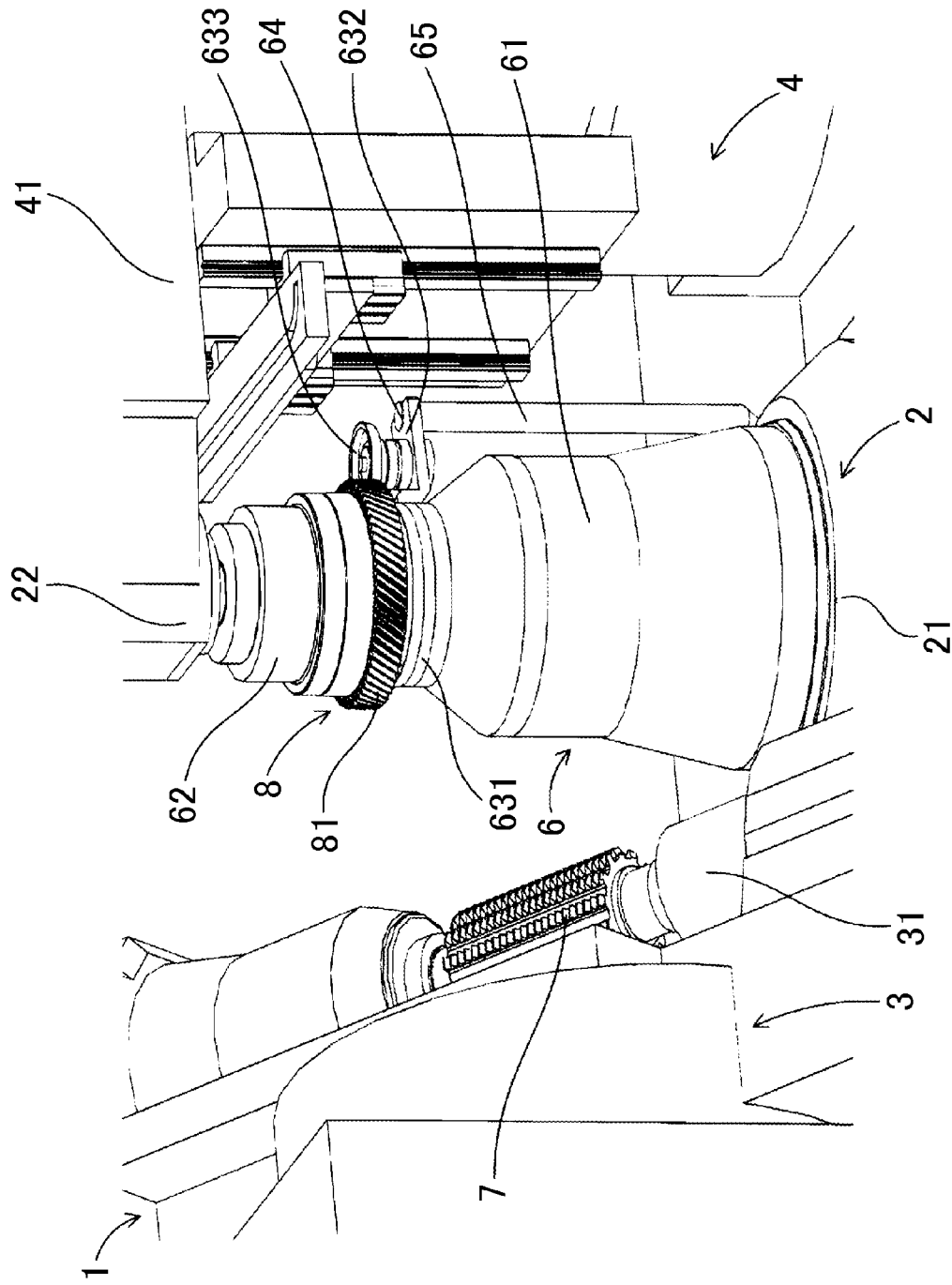
FIG. 6 is a perspective view showing the rotation processing machine in which the rotation support jig and the cylindrical workpiece have been set according to the embodiment.

As shown in FIGS. 5 and 6, a deburring tool 63 is attached to the one jig portion 61 of the rotation support jig 6. The deburring tool 63 is attached so as to be able to turn about a central axis 601 of the one jig portion 61, and is configured to deburr an end face 80 of the cylindrical workpiece 8 held between the one jig portion 61 and the other jig portion 62.

The deburring tool 63 of the present embodiment has a ring portion 631 that is rotatable about the central axis 601 of the one jig portion 61, a support arm portion 632 provided so as to protrude radially outward of the ring portion 631, and a rotating tool portion 633 that is supported in the support arm portion 632 so as to be rotatable about a central axis parallel to the central axis 601 of the one jig portion 61. The support arm portion 632 is provided with a stopper groove 64 that engages with a retaining member 65 placed (standing) on a mount of the rotation processing machine 1.

When the one jig portion 61 is mounted onto the one rotating spindle 21, the stopper groove 64 of the support arm portion 632 engages with the retaining member 65 so that the deburring tool 63 does not turn about the central axis 601 of the one jig portion 61 when the one rotating spindle 21 and the one jig portion 61 rotate.

As shown in FIG. 7, the cutting tool 7 of the present embodiment is held on the pallet 70 that is held by each gripper 5 of the turning loader 4. The pallet 70 has a base portion 71 that is held by the gripper 5, and a cutting-tool holding portion 72 that is formed at a position offset from the center of the base portion 71 and that holds the cutting tool 7. The base portion 71 is formed in a disc shape so that each gripper 5 can easily hold the base portion 71. The cutting-tool holding portion 72 is configured so that a pair of receiving portions 721 receive the shaft portions at both ends of the cutting tool 7 placed such that its axis extends in the horizontal direction. With the pallet 70 being held by the gripper 5, the cutting-tool holding portion 72 of the pallet 70 is located outward of the turning radius of the gripper 5.

The processing device 3 is configured to advance the cutting-tool mounting portion 31 and move the cutting-tool mounting portion 31 up and down so that the cutting tool 7 in the cutting-tool holding portion 72 of the pallet 70 held by the gripper 5 held at the third height position 50C is mounted on the cutting-tool mounting portion 31.

As shown in FIG. 2, the height position of the gripper 5 is changed to the following three height positions when the gripper 5 is moved between the external delivery/reception position 502 and the internal delivery/reception position 501 while holding the cylindrical workpiece 8. That is, the height position of the gripper 5 can be changed to: a height position where the gripper 5 delivers and receives the cylindrical workpiece 8 at the external delivery/reception position 502; a height position where the gripper 5 holds the cylindrical workpiece 8 and is turned by the turning loader 4; and a height position where the gripper 5 delivers and receives the cylindrical workpiece 8 at the internal delivery/reception position 501. The height position where the gripper 5 holds the cylindrical workpiece 8 and is turned by the turning loader 4 is the first height position 50A where the gripper 5 delivers and receives the cylindrical workpiece 8 to and from the rotating device 2. The first height position 50A is set as a height position where the cylindrical workpiece 8 held by the gripper 5 is located slightly higher than the one jig portion 61 on the rotating device 2.

As shown in FIG. 3, the height position of the gripper 5 is changed to the following three height positions when the gripper 5 is moved between the external delivery/reception position 502 and the internal delivery/reception position 501 while holding the rotation support jig 6. That is, the height position of the gripper 5 can be changed to: a height position where the gripper 5 delivers and receives the rotation support jig 6 at the external delivery/reception position 502; a height position where the gripper 5 holds the rotation support jig 6 and is turned by the turning loader 4; and a height position where the gripper 5 delivers and receives the rotation support jig 6 at the internal delivery/reception position 501. The height position where the gripper 5 holds the rotation support jig 6 and is turned by the turning loader 4 is the second height position 50B where the gripper 5 delivers and receives the rotation support jig 6 to and from the rotating device 2. The second height position 50B is set as a height position where the rotation support jig 6 held by the gripper 5 is located slightly higher than the one rotating spindle 21 of the rotating device 2.

As shown in FIG. 4, the height position of the gripper 5 is changed to the following three height positions when the gripper 5 is moved between the external delivery/reception position 502 and the internal delivery/reception position 501 while holding the pallet 70 with the cutting tool 7 being held thereon. That is, the height position of the gripper 5 can be changed to: a height position where the gripper 5 delivers and receives the pallet 70 at the external delivery/reception position 502; a height position where the gripper 5 holds the pallet 70 and is turned by the turning loader 4; and a height position where the gripper 5 delivers and receives the cutting tool 7 held on the pallet 70 to and from the cutting-tool mounting portion 31 of the processing device 3 at the internal delivery/reception position 501. The height position where the gripper 5 holds the pallet 70 and is turned by the turning loader 4 is the third height position 50C where the gripper 5 delivers and receives the cutting tool 7 to and from the processing device 3. The third height position 50C is set as a height position where the pallet 70 held by the gripper 5 is located slightly higher than the one jig portion 61 on the rotating device 2.

Operation of the rotation processing machine 1 of the present embodiment will be described below.

As shown in FIG. 4, when processing the cylindrical workpiece 8, the pallet 70 holding the cutting tool 7 corresponding to the kind of cylindrical workpiece 8 is held by the gripper 5 at the external delivery/reception position 502, and the height position of this gripper 5 is set to the third height position 50C where the gripper 5 delivers and receives the cutting tool 7. The third height position 50C is set to such a height that the gripper 5 and the pallet 70 do not interfere with the one jig portion 61 on the one rotating spindle 21 of the rotating device 2 and the other jig portion 62 on the other rotating spindle 22 when the turning loader 4 is turned. With the gripper 5 being held at the third height position 50C, the turning loader 4 is turned to move the cutting tool 7 on the pallet 70 held by the gripper 5 from the external delivery/reception position 502 to the internal delivery/reception position 501 so that the cutting tool 7 faces the rotating device 2 and the processing device 3. Then, the cutting-tool mounting portion 31 of the processing device 3 is moved and the cutting tool 7 held by the gripper 5 is mounted onto the cutting-tool mounting portion 31.

As shown in FIG. 3, the rotation support jig 6 corresponding to the kind of cylindrical workpiece 8 is held by the gripper 5 at the external delivery/reception position 502, and the height position of this gripper 5 is set to the second height position 50B where the gripper 5 delivers and receives the rotation support jig 6. The second height position 50B is set to such a height that the gripper 5 and the rotation support jig 6 do not interfere with the one rotating spindle 21 of the rotating device 2 when the turning loader 4 is turned. With the gripper 5 being held at the second height position 50B, the turning loader 4 is turned to move the rotation support jig 6 held by the gripper 5 from the external delivery/reception position 502 to the internal delivery/reception position 501 so that the rotation support jig 6 faces the rotating device 2. The gripper 5 is moved downward to mount the one jig portion 61 of the rotation support jig 6 held by the gripper 5 onto the one rotating spindle 21 of the rotating device 2.

The other rotating spindle 22 on the turning central support column 41 is moved downward to mount the other jig portion 62 combined with the one jig portion 61 onto the other rotating spindle 22. Then, the other rotating spindle 22 is moved upward and withdrawn.

As shown in FIG. 2, a cylindrical workpiece 8 before processing is held by the gripper 5 at the external delivery/reception position 502, and the height position of this gripper 5 is set to the first height position 50A where the gripper 5 delivers and receives the cylindrical workpiece 8. The first height position 50A is set to such a height that the gripper 5 and the cylindrical workpiece 8 do not interfere with the one jig portion 61 on the one rotating spindle 21 of the rotating device 2 when the turning loader 4 is turned. The other jig portion 62 on the other rotating spindle 22 of the rotating device 2 is withdrawn to such a position that the other jig portion 62 does not interfere with the cylindrical workpiece 8. With the gripper 5 being held at the first height position 50A, the turning loader 4 is turned to move the cylindrical workpiece 8 held by the gripper 5 from the external delivery/reception position 502 to the internal delivery/reception position 501 so that the cylindrical workpiece 8 faces the rotating device 2.

The gripper 5 is moved downward to mount the cylindrical workpiece 8 onto the one jig portion 61 mounted on the one rotating spindle 21 of the rotating device 2. The other rotating spindle 22 of the rotating device 2 is moved downward to insert the central shaft 621 of the other jig portion 62 mounted on the other rotating spindle 22 into the central hole 83 of the cylindrical workpiece 8 and the central hole 611 of the one jig portion 61 mounted on the one rotating spindle 21 (see FIG. 5).

In this manner, the cylindrical workpiece 8 is carried in, and is held between the one jig portion 61 and the other jig portion 62 so that the cylindrical workpiece 8 can be rotated by the rotating device 2.

Then, the cutting tool 7 on the processing device 3 is rotated to cut tooth surfaces 81 on the outer periphery of the cylindrical workpiece 8 rotated by the rotating device 2. Thereafter, the other rotating spindle 22 and the other jig portion 62 are withdrawn upward, the processed cylindrical workpiece 8 mounted on the one jig portion 61 on the one rotating spindle 21 is held by the gripper 5 located at the internal delivery/reception position 501, and the turning loader 4 is turned to move this gripper 5 to the external delivery/reception position 502, thereby carrying the cylindrical workpiece 8 out. Subsequently, the operation of carrying the cylindrical workpiece 8 in, processing the cylindrical workpiece 8, and carrying the cylindrical workpiece 8 out is repeated according to the number of cylindrical workpieces 8 to be processed.

If changeover of the rotation support jig 6 or the cutting tool 7 is needed according to the kind of cylindrical workpiece 8 to be processed, the turning loader 4 is turned so that the gripper 5 holding the rotation support jig 6 or the cutting tool 7 moves between the internal delivery/reception position 501 and the external delivery/reception position 502 while being held at the second height position 50B or the third height position 50C in a manner similar to that described above.

As described above, in the rotation processing machine 1, the height position of the gripper 5 on the turning loader 4 can be changed to the three height positions, namely, the height position where the gripper 5 delivers and receives the cylindrical workpiece 8, the height position where the gripper 5 delivers and receives the rotation support jig 6, and the height position where the gripper 5 delivers and receives the cutting tool 7. This can reduce the time required to move the gripper 5 of the turning loader 4 up and down when delivering and receiving the cylindrical workpiece 8, the rotation support jig 6, and the cutting tool 7, and thus can reduce the time required for transfer of the cylindrical workpiece 8 and for changeover of the rotation support jig 6 and the cutting tool 7.

In the rotation processing machine 1, the cylindrical workpiece 8, the rotation support jig 6, and the cutting tool 7 can be delivered and received by using the same turning loader 4. This can also reduce the time required for changeover of the rotation support jig 6 and the cutting tool 7.

What is claimed is:

1. A rotation processing machine, comprising:
    a rotating device that supports a cylindrical workpiece via a rotation support jig and rotates;
    a processing device on which a cutting tool is mounted to process the cylindrical workpiece; and
    a turning loader that has a plurality of grippers arranged about a turning central axis and that turns so that the plurality of grippers sequentially face the rotating device, wherein
    each of the plurality of grippers includes a respective pair of gripping portions and is configured to individually vary, in a direction perpendicular to the turning central axis, an interval between the gripping portions of the respective pair of gripping portions,
    the plurality of grippers are configured to individually move up and down, and a height position of each of the plurality of grippers is settable to a first height position where each respective gripper delivers and receives the cylindrical workpiece to and from the rotating device, and a second height position where each respective gripper delivers and receives the rotation support jig to and from the rotating device, and
    the turning loader is configured to turn each of the grippers between an external delivery/reception position where each respective gripper faces an external transfer stand and an internal delivery/reception position where each respective gripper faces the rotating device, and is configured to set the height position of each respective gripper to the first height position or the second height position at one of the external delivery/reception position and the internal delivery/reception position, and to turn each respective gripper to the other delivery/reception position while holding each respective gripper at the set height position.

2. The rotation processing machine according to claim 1, wherein
    the rotation support jig is formed by one jig portion that is mounted on one rotating spindle of the rotating device, and another jig portion that is mounted on another rotating spindle placed coaxially with the one rotating spindle in the rotating device, and
    the turning loader is configured to allow each respective gripper to hold the rotation support jig having the one jig portion combined with the other jig portion.

3. The rotation processing machine according to claim 2, wherein
    the height position of each of the plurality of grippers is settable to a third height position where each respective gripper delivers and receives the cutting tool to and from the processing device, and
    the turning loader is configured to set the height position of each respective gripper to the third height position at one of the external delivery/reception position and the internal delivery/reception position, and to turn each respective gripper to the other delivery/reception position while holding each respective gripper at the set height position.

4. The rotation processing machine according to claim 1, wherein
    the height position of each of the plurality of grippers is settable to a third height position where each respective gripper delivers and receives the cutting tool to and from the processing device, and
    the turning loader is configured to set the height position of each respective gripper to the third height position at one of the external delivery/reception position and the internal delivery/reception position, and to turn each respective gripper to the other delivery/reception position while holding each respective gripper at the set height position.

5. The rotation processing machine according to claim 1, further comprising an actuator provided for each of the plurality of grippers, respectively, for individually operating the plurality of grippers.

6. A rotation processing machine, comprising:
a rotating device that supports a cylindrical workpiece via a rotation support jig and rotates:
a processing device on which a cutting tool is mounted to process the cylindrical workpiece; and
a turning loader that has a plurality of grippers arranged about a turning central axis and that turns so that the plurality of grippers sequentially face the rotating device, wherein
each of the plurality of grippers includes a respective pair of gripping portions and is configured to vary, in a direction perpendicular to the turning central axis, an interval between the gripping portions of the respective pair of gripping portions,
the plurality of grippers are configured to individually move up and down, and a height position of each of the plurality of grippers is settable to a first height position where each respective gripper delivers and receives the cylindrical workpiece to and from the rotating device, and a second height position where each respective gripper delivers and receives the rotation support jig to and from the rotating device, and
the turning loader is configured to turn each of the grippers between an external delivery/reception position where each respective gripper faces an external transfer stand and an internal delivery/reception position where each respective gripper faces the rotating device, and is configured to set the height position of each respective gripper to the height position or the second height position at one of the external delivery/reception position and the internal delivery/reception position, and to turn each respective gripper to the other delivery/reception position while holding each respective gripper at the set height position, wherein
the height position of each of the plurality of gripper is settable to a third height position where each respective gripper delivers and receives the cutting tool to and from the processing device, and
the turning loader is configured to set the height position of each respective gripper to the third height position at one of the external delivery/reception position and the internal delivery/reception position, and to turn each respective gripper to the other delivery/reception position while holding each respective gripper at the set height position, wherein
the cutting tool is configured to be held by a pallet,
the pallet has a base portion that is held by each respective gripper, and a cutting-tool holding portion that is formed at a position offset from a center of the base portion and that holds the cutting tool, and with the pallet being held by each respective gripper, the cutting-tool holding portion is located outward of a turning radius of each respective gripper, and
the processing device is configured so that a cutting-tool mounting portion of the processing device is advanced, and so that the cutting tool held on the cutting-tool holding portion of the pallet held by each respective gripper is mounted on the cutting-tool mounting portion that has been advanced.

7. The rotation processing machine according to claim 6, wherein
the processing device is configured so that the cutting-tool mounting portion is moved up and down, and is configured so that, with each respective gripper being held at the third height position, the cutting tool on the cutting-tool holding portion of the pallet held by each respective gripper is received by the cutting-tool mounting portion.

8. A rotation processing machine, comprising:
a rotating device that supports a cylindrical workpiece via a rotation support jig and rotates:
a processing device on which a cutting tool is mounted to process the cylindrical workpiece; and
a turning loader that has a plurality of grippers arranged about a turning central axis and that turns so that the plurality of grippers sequentially face the rotating device, wherein
each of the plurality of gripper includes a respective pair of gripping portions and is configured to vary, in a direction perpendicular to the turning central axis, an interval between the gripping portions of the respective pair of gripping portions,
the plurality of grippers are configured to individually move up and down, and a height position of each of the plurality of grippers is settable to a first height position where each respective gripper delivers and receives the cylindrical workpiece to and from rotating device, and a second height position where each respective gripper delivers and receives the rotation support jig to and from the rotating device, and
the turning loader is configured to turn each of the gripper between an external delivery/reception position where each respective gripper faces an external transfer stand and an internal delivery/reception position where each respective gripper faces the rotating device, and is configured to set the height position of each respective gripper to the first height position or the second height position at one of the external delivery/reception position and the internal delivery/reception position, and to turn each respective gripper to the other delivery/reception position while holding each respective gripper at the set height position, wherein
the rotation support jig is formed by one jig portion that is mounted on one rotating spindle of the rotating device, and another jig portion that is mounted on another rotating spindle placed coaxially with the one rotating spindle in the rotating device, and
the turning loader is configured to allow each respective gripper to hold the rotation support jig having the one jig portion combined with the other jig portion, wherein
the height position of each of the plurality of grippers is settable to a third height position where each respective gripper delivers and receives the cutting tool to and from the processing device, and
the turning loader is configured to set the height position of each respective gripper to the third height position at one of the external delivery/reception position and the internal delivery/reception position, and to turn each respective gripper to the other delivery/reception position while holding each respective gripper at the set height position, wherein
the cutting tool is configured to be held by a pallet,
the pallet has a base portion that is held by each respective gripper, and a cutting-tool holding portion that is formed at a position offset from a center of the base portion and that holds the cutting tool, and with the pallet being held by each respective gripper, the cutting-tool holding portion is located outward of a turning radius of each respective gripper, and the processing device is configured so that a cutting-tool mounting portion of the processing device is advanced, and so that the cutting tool held on the cutting-tool holding portion of the pallet held by each respective gripper is mounted on the cutting-tool mounting portion that has been advanced.

9. The rotation processing machine according to claim 8, wherein the processing device is configured so that the cutting-tool mounting portion is moved up and down, and is configured so that, with each respective gripper being held at the third height position, the cutting tool on the cutting-tool holding portion of the pallet held by each respective gripper is received by the cutting-tool mounting portion.

* * * * *